United States Patent [19]

Doppler

[11] 4,170,486

[45] Oct. 9, 1979

[54] CARBON BLACK COMPOSITIONS AND BLACK-PIGMENTED COMPOSITIONS CONTAINING SAME

[75] Inventor: Leonard H. Doppler, Lexington, Mass.

[73] Assignee: Cabot Corporation, Boston, Mass.

[21] Appl. No.: 574,548

[22] Filed: May 5, 1975

[51] Int. Cl.² ............................................. C09C 1/48
[52] U.S. Cl. .................................. 106/307; 106/304; 106/308 F; 106/299
[58] Field of Search ............. 106/307, 304, 299, 308 F

[56] References Cited

U.S. PATENT DOCUMENTS

| | | | |
|---|---|---|---|
| 2,068,066 | 1/1937 | O'Brien | 106/308 F |
| 2,920,976 | 1/1960 | Damusi | 106/308 F |
| 3,615,809 | 10/1971 | Nagle | 106/307 |

FOREIGN PATENT DOCUMENTS 692147  8/1964  Canada ..................................... 106/307

*Primary Examiner*—Winston A. Douglas
*Assistant Examiner*—J. V. Howard
*Attorney, Agent, or Firm*—Jack Schuman; Barry R. Blaker; Lawrence A. Chaletsky

[57] ABSTRACT

Black-pigmented coating compositions and carbon black compositions for pigmentation of such coatings are disclosed. Superior color development properties are imparted to said compositions by the provision therein of minor amounts of certain organic acid salts of iron or zirconium.

15 Claims, No Drawings

CARBON BLACK COMPOSITIONS AND BLACK-PIGMENTED COMPOSITIONS CONTAINING SAME

BACKGROUND OF THE INVENTION

The present invention relates generally to black-pigmented coating compositions and is more specifically concerned with black-pigmented enamels and lacquers and carbon black pigment compositions therefor.

It is well known to those skilled in the coating composition arts that carbon black pigmentation of solvent-reduced coating compositions is one of the most difficult of pigmentations to perform to consistent and high standards of color development. It has been generally held that a predominant problem attendant carbon black pigmentation of solvent-reduced coating compositions such as acrylic enamels, nitrocellulose lacquers and alkyd enamels resides in the difficulty of fully realizing the potential for black color development of this class of pigments as compared to the relative ease by which development can generally be achieved with other pigments conventionally employed in the art. Accordingly, both the carbon black and protective and decorating coating arts have intensively sought techniques and formulations by which the color development properties of carbon black coating composition pigments, such as jetness, masstone or surface appearance, are improved. Several of the approaches developed in response to this problem are disclosed in such patent literature as: U.S. Pat. No. 3,226,244, Jordan et al., Dec. 28, 1965; U.S. Pat. No. 3,368,990, Goulston, Feb. 13, 1968; U.S. Pat. No. 3,539,372, Hardy et al., Nov. 10, 1970; U.S. Pat. No. 3,578,635, Hardy et al., May 11, 1971; U.S. Pat. No. 2,860,110, Godshalk, Nov. 11, 1958; and U.S. Pat. No. 2,989,492, Sanderson, June 20, 1961.

In accordance with the present invention another unique and highly successful remedy to the problem of color development of carbon black pigments in solvent-reduced protective and decorative coating compositions is provided.

It is a principal object of the invention to provide improved carbon black-pigmented protective and decorative coating compositions.

It is another object of the invention to provide novel carbon black-pigmented protective and decorative coating compositions having one or more improved color properties.

It is another object of the invention to provide novel carbon black compositions having one or more improved color development properties upon dispersion thereof into protective and decorative coating compositions.

Other objects and advantages of the invention will in part be obvious and will in part appear hereinafter.

SUMMARY OF THE INVENTION

In accordance with the present invention it has been discovered that the color development properties of high volatile content carbon black pigments in solvent-reduced protective and decorative coating composition vehicles are enhanced when, at the time of dispersion of such pigments, there is present a minor but effective amount of an organic acid salt of iron, zirconium or mixture thereof. The improved carbon black pigment composition of the invention comprises high volatile content carbon black treated with a minor but effective amount of an organic acid salt of iron, zirconium or mixture thereof.

DESCRIPTION OF PREFERRED EMBODIMENTS

The coating compositions of the present invention are carbon black-pigmented decorative and/or protective lacquers and enamels based on liquid vehicles comprising one or more resin binders dissolved in a solvent therefor. Enamels belong to one broad class of coating compositions comprising an intimate dispersion of one or more pigments in a film-forming vehicle, the vehicle, in turn, comprising a film-forming resinous component dissolved in a solvent therefor. The film-forming binder can comprise a resin-oil mixture or can be substantially entirely composed of a synthetic resin. Those enamels containing drying agents are generally converted to finished decorative or protective films by air oxidation of the binder upon exposure to the atmosphere. Where the film-forming binder of the vehicle is composed substantially entirely of synthetic resin, the binder is polymerized or cured to the dry finished film by heat, curing agents, air oxidation or combinations thereof. Wet lacquer films, on the other hand, comprise one or more film-forming binder resins in solution which dry to solid films primarily by evaporation of the solvent from the vehicle.

The resinous binders forming the film-forming component of the solvent-reduced vehicles of the present invention are subject to wide variation and are generally non-critical. Accordingly, such conventional synthetic enamel and lacquer resins as polyesters, epoxies, urethanes, silicones, alkyds and vinyls are all generally entirely suitable as the film-forming resin component of the vehicle as are the naturally occurring oxidizable or polymerizable vegetable and animal oils such as linseed, soybean, menhaden, tung, safflower and castor oils and the tall-oil fatty acids. It is further obvious that particular species of the above families of film-forming vehicle components can often be selectively combined in various proportions to provide particularly desirable properties. For example, a vehicle based on a solution of polyvinylchloride binder resin can be further modified by the addition thereto of a relatively minor amount of another monomeric or resinous binder such as vinyl acetate, castor oil-derived urethanes, alkyd resins and the like. Likewise, vehicles comprising alkyd resin film-forming binders can often be beneficially modified by the incorporation of a relatively minor proportion of one or more phenolic resins.

It has been found that solvent-reduced coating compositions based on vehicles comprising resinous film-forming binder components chosen from the group consisting of acrylic, alkyd and nitrocellulose resins, and mixtures thereof, are particularly susceptible of the benefits afforded by the invention. Accordingly, solvent-reduced coating compositions in which a resin chosen from the group consisting of alkyd, acrylic and nitrocellulose resins, and mixtures thereof, is employed as the predominant film-forming binder component constitute preferred embodiments of the invention.

Film-forming acrylic resinous binders are synthetic resins produced by the polymerization of monomers chosen from the group consisting of esters of acrylic acids, esters of methacrylic acid and derivatives thereof, with or without the presence of minor amounts of other compatible monomers and polymers. Examples of such acrylic resins are homopolymers and copolymers of ethyl methacrylate, n-butyl methacrylate, methyl acrylate, 2-ethylhexyl acrylate, ethyl acrylate, isobutyl methacrylate, n-tetradecyl methacrylate, n-lauryl methacrylate. Further details relating to film-forming acrylic resin binder components useful in solvent-reduced coating systems may be had by reference to "Acrylic Resins", Gerould Allyn, Unit Seventeen of *Federation Series on Coatings Technology*, March 1971, Federation of Societies for Paint Technology.

Film-forming alkyd resin binders are generally defined as products of reaction between polybasic acids or their anhydrides and a polyhydric alcohol. The polyhydric alcohols employed in the production of film-forming alkyd resin binders are represented by such compounds as ethylene glycol, glycerol, trimethylol ethane, pentaerythritol, sorbitol, trimethylol propane and the like. Polybasic acid starting materials suitable for the production of alkyd resin binders are represented by such compounds as phthalic acid, phthalic anhydride, isophthalic acid, terephthalic acid, maleic anhydride, fumaric acid and trimellitic anydride. As in the case of the acrylic resin binders, it is also conventional to include alkyd resin binder materials additional minor quantities of other modifiers which may, in and of themselves, be resins, prepolymers or monomers. Such modifiers are represented by materials such as rosin, linseed oil, coconut oil, linoleic acid, phenolic resins, styrene, alpha methyl styrene, vinyl toluene, acrylic esters, silicones and the like. Further details concerning film-forming alkyd resin binders useful in the present invention can be had by reference to "Alkyd Resins", James R. Blegen, Unit Five of *Federation Series on Coatings Technology*, March 1967, Federation of Societies for Paint Technology.

Suitable organic solvents for use in the solvent-reduced vehicles of the coating compositions of the invention are also susceptible of substantial variation, the essentials being that the solvent form a true solution with the film-forming resinous binder and, of course, not react deleteriously with the other ingredients of the coating composition. Where the coating composition is to be a lacquer, it is further necessary, of course, that the organic solvent be fugitive in nature and thus be readily driven off by evaporation. Accordingly, common solvents employed in the performance of the coating compositions of the invention are: toluene, xylene, benzene, butyl acetate, acetone, ethyl acetate, methyl ethyl ketone, methyl isobutyl ketone, ethylene glycol monoethyl ether acetate and mixtures thereof. A more detailed exposition concerning organic solvents and their employment in formulating solvent-reduced vehicles for coating compositions can be had by reference to "Solvent", Wayne R. Fuller, Unit Six of *Federation Series on Coatings Technology*, May 1967, Federation of Societies for Paint Technology.

The quantity of film-forming resinous binders forming the solute component of the coating vehicle is also subject to considerable variation. Generally speaking, the resinous binder component can comprise from about 10 to about 60 percent of the total vehicle weight.

Carbon black pigments useful in the practice of the invention are generally any carbon black pigment having a volatile content of at least 4% by weight, such as may be produced by aftertreatment of carbon blacks produced by the so-called furnace or channel processes.

A critical element relating to carbon blacks suitable for use in the present invention residues in the requirement that the carbon black pigment employed have a volatile content of at least about 4% by weight. By "volatile content" is meant strongly adsorbed complexes of carbon, oxygen and/or hydrogen which cannot be removed from the carbon black pigment by common extraction techniques. Carbon blacks having volatile contents of at least 6% by weight will usually be found to be even more responsive to the beneficial color development effects of the invention. Volatile content properties are usually conferred to carbon black pigments by partial oxidation of raw material carbon blacks having substantially lower volatile contents. The carbon black art has developed many aftertreatment methods by which such oxidation aftertreatment can be achieved, such as by contacting the raw material carbon black at elevated temperatures with an oxidant such as air, oxygen or with an oxidizing agent such as nitric acid, nitrogen oxides and mixtures thereof for a sufficient period of time to result in the desired increase in volatile content. Suitable oxidation of raw material carbon blacks can also be generally achieved by contacting the carbon black at relatively low temperatures with a highly active oxidant such as ozone. Further details relating to various methods by which the volatile content of carbon blacks can be increased by partial oxidation thereof can be had by reference to such patent literature as: U.S. Pat. Nos. 3,226,224; 2,420,810; 3,216,843; 3,279,935; 3,318,720; 3,398,009 and 3,536,512. A suitable test for the determination of the volatile content of a carbon black pigment is fully disclosed in ASTM D 1620–60.

The quantity of the carbon black pigment utilized in the solvent-reduced coating compositions of the invention is subject to substantial variation. Generally speaking, the carbon black pigment will be employed in amounts within the range of between about 0.1 and about 20% by weight of the total solvent-reduced coating composition. Where pure black colored coating compositions are desired, the carbon black pigment will normally be present as the major pigment and will constitute at least 1% of the total coating composition weight. On the other hand, where the coating composition is to employ carbon black and another light colored pigment, such as will be the case when grey colored coating compositions are to be performed, the quantity of the carbon black pigment component can often be substantially less than about 1% by weight of the total coating composition, for example, 0.5% or even 0.1%.

Whatever the solvent-reduced vehicle and whatever the quantity of the carbon black pigment having a volatile content of at least 4% to be employed, however, it is another essential of the invention that there be additionally present, during dispersion of the carbon black pigment into the vehicle, a minor but effective amount of an organic acid salt of iron or zirconium and mixtures thereof. Said organic acid salt of iron or zirconium should ordinarily be present in an amount sufficient to provide from about 0.05 to about 3%, as metal, based on the weight of the carbon black pigment. Preferably, said organic acid salt of iron, zirconium of their mixture will be present in an amount sufficient to provide between about 0.5 to about 1.5%, as metal, based on the weight of the carbon black pigment.

The organic acid salts of iron or zirconium which are suitable in the practice of the invention are, generally speaking, those which are soluble or colloidally miscible in the vehicle of the coating composition. Specific examples of suitable organic acid salts of iron or zirconium are: iron naphthenate, iron octoate, iron tallate, iron oleate, iron resinate, zirconium octoate, zirconium naphthenate, zirconium plamitate, zirconium linoleate and the like. Of these, the naphthenic acid and fatty acid salts of iron and zirconium are generally preferred.

The dispersion and mixing of the ingredients of the coating compositions of the invention can be accomplished in any suitable manner such as by conventional ball or roll milling techniques. Generally, the solvent-reduced vehicle will have already been performed at the time of said dispersion, in other words, the film-forming resinous binder component will be in solution in the solvent therefor at the time of dispersion of the carbon black pigment and the organic acid salt of iron or zirconium thereinto. Thus, the carbon black pigment and the organic acid salt of iron or zirconium can be incorporated as separate appropriately proportioned streams thereof into the vehicle or, preferably, the carbon black pigment will be first treated with the organic acid salt of iron or zirconium and the resulting carbon black pigment composition thereafter added as a single charge to the dispersing or mixing zone or device.

Performance of the carbon black pigment compositions of the invention can be generally readily accomplished by treatment of the carbon black pigment, in fluffy or pelleted form, with the desired amount of the iron or zirconium acid salt. For instance, the fluffy form of carbon black pigment can be both wet pelletized and treated with the organic acid salt of iron or zirconium by charging the fluffy raw material carbon black through a conventional pelletization apparatus while the iron or zirconium salt is contacted with the bed of pelletizing carbon black. Where the carbon black pigment is already in pelleted form, it can be similarly treated by mild agitation of a bed thereof in the presence of the organic acid salt of iron or zirconium in a revolving drum type treating apparatus. Of course, in either of the treatments outlined above, the rate of addition of the organic acid salt of iron or zirconium to the contacting zone will be proportioned so as to result in a finished carbon black pigment composition having associated therewith a quantity of the iron or zirconium salt treating agent residing within the broad concentration range set forth hereinabove.

Obviously, other components conventionally employed in the solvent-reduced protective or decorative coatings formulation art, such as pigments other than carbon black, extenders, antiflooding agents, antigelling agents, antiskinning agents, driers, plasticizers, stabilizers, preservatives and viscosity control agents can also be employed in the coating compositions of the invention and can often be mixed or dispersed into the vehicle prior to, during or after dispersion of the carbon black pigment and the organic acid salt of iron or zirconium.

There follow a number of non-limiting examples.

EXAMPLE 1

Mill paste compositions are performed in accordance with Table I forming part hereof. A standard mill paste dispersion and let-down technique is employed in formulating sample alkyd enamels. The procedure employed is as follows:

The mill paste ingredients are separately charged into a one-quart stainless steel ball mill receptacle containing 7 lbs., 5 oz. of ½ inch diameter and 4 lbs., 11 oz. of ¼ inch diameter stainless steel balls. The receptacle is then sealed, placed on power driven rollers and rolled for 21 hours. Thereafter, 254 grams of the resulting mill paste formulation is removed from the receptacle. Next, a three-stage reduction of the mill paste remaining in the ball mill receptacle is performed. The first reduction is achieved by charging 130.2 grams of virgin Aroplaz 2580 X60 alkyd resin vehicle into the receptacle followed by roll milling for about 30 minutes. The second reduction is a duplicate of said first reduction. The third reduction comprises introducing a further charge of the following ingredients into the ball mill receptacle:

| | |
|---|---|
| alkyd resin[1] | 160.6 gms |
| ethyl acetate | 41.7 gms |
| n-butyl alcohol | 41.7 |
| melamine/formaldehyde resin[4] | 160.6 gms |
| aromatic solvent[5] | 11 gms |
| diethylamine | 0.1 gm |
| silicone solution[6] | 2.0 gms |

[1], [4] and [5] refer to like footnotes, Table I.
[6] a 2% by weight solution of SF-69 silicone fluid in xylene (General Electric Company, Silicone Products Department, Waterford, New York).

After this third charge, the resulting enamel formulation is ball milled for about one hour, the liquid contents dumped and separated from the mill balls.

TABLE I

| Mill Paste No. | 1 (control) | 2 | 3 |
|---|---|---|---|
| Alkyd resin[1] (grams) | 254.4 | 254.4 | 254.4 |
| Carbon black[2] (grams) | 46.8 | 46.8 | 46.8 |
| Iron naphthenate[3] (grams) | — | 1.2% (Fe) | — |
| Zirconium naphthenate[3] (grams) | | | 1.2% (Zr) |
| Melamine/formaldehyde resin[4] (grams) | 129.6 | 129.6 | 129.6 |
| Aromatic solvent[5] (grams) | 125 | 125 | 125 |

[1] Aroplaz 2580 X60, a short-oil, coconut oil, non-drying alkyd resin comprising a 60% by weight resin solids solution in xylene (Ashland Chemical Company, Columbus, Ohio).
[2] Black Pearls 1300, a pelleted, partially oxidized color black produced by a furnace process having a Nigrometer scale value of about 68 and a volatile content of about 9.4% by weight thereof. The dibutyl phthalate oil absorption value (ASTM D 2414-20) of this pelleted black is about 99 mls/100 gms black (Cabot Corporation, Boston, Massachusetts).
[3] The iron and zirconium salts are each supplied as 6% solutions (expressed in terms of metal content) in a compatible solvent. Said salts were each employed at a loading of 20% of the salt solution by weight of the carbon black. Accordingly, the quantities given in Table I are each expressed as the weight percent of metal of the salt based on the weight of carbon black.
[4] Resimene 876, a solution of butylated melamine/formaldehyde resin in a 4:1 weight mixture of butanol and xylene having a resin solids content of about 50% by weight (Monsanto Chemical Co., St. Louis, Missouri).
[5] Solvesso 150, a high boiling aromatic solvent (Humble Oil and Refining Company, Houston, Texas).

COLOR DEVELOPMENT PROPERTIES

The color development properties of the carbon black pigmented coating compositions produced in accordance with the above are determined as follows:

Sample Preparation—Sample coating compositions are cast in side by side manner on a single glass plate. The cast films are produced by drawing down a puddle of the coating composition liquid employing a 3 mil Bird drawdown applicator. Next, the wet drawdowns are oven cured for a period of about 20 minutes at a temperature of about 300° F.

SAMPLE EVALUATION

Jetness—Jetness values of the cured carbon black pigmented coatings are determined by direct visual comparisons thereof. The jetness of the control composition is assigned a value of zero and the test compositions embodying the invention are compared thereto. The lighter the black color of the test composition relative to the control the greater is the positive jetness value thereof while the darker the test composition relative to the control the more negative is the jetness value thereof. The jetness values of the coatings produced in this example are presented in Table II. As will be noted, each of the coating compositions containing the organic acid salt of iron or zirconium at the time of dispersion of the carbon black pigment into the mill paste is substantially darker than the control.

Masstone—The glass plate, bearing thereon the control and experimental coatings, is visually observed at an angle of about 20°. Tonal differences between the control and experimental coatings are compared on the basis of a brown to blue range of hues perceived. Said tonal range is assigned a numerical range of from −10 to +10, a very brown tone being −10 while the bluest tone is +10. Relative blueness of a black-pigmented coating is a highly desirable color property thereof. The data arising from this test is tabulated in Table II.

Surface Appearance—The glass plate, bearing thereon the control and experimental coatings, is visually observed at an angle of about 20°. The distinctness with which images are reflected in the surfaces of the coatings reveals to the observer comparative differences in both gloss and clarity of the coatings under examination. Herein, the overall observed surface appearances of the coatings are reported as being poor, moderately poor, good, very good and excellent. The results of this test appear in Table II.

TABLE II

| COLOR DEVELOPMENT PROPERTIES | | | |
|---|---|---|---|
| | Enamel No. | | |
| | 1 (control) | 2 | 3 |
| Jetness | 0 | −8 | −5 |
| Masstone | 0 | +5 | +10 |
| Surface Appearance | very good | excellent | very good |

EXAMPLE 2

This example is essentially a duplicate of Example 1 with the exception that the carbon black and iron or zirconium salt adjuvants are not separately charged into the ball mill as is the case in mill paste Nos. 2 and 3 of Example 1. Instead, pelleted carbon black pigment compositions are previously prepared by spraying the solution of iron or zirconium naphthenate onto a known quantity of gently agitating pelleted carbon black pigment containing in a rotating drum. Improvements in color development properties of the coating compositions of the invention prepared in this manner are substantially similar to those achieved in Example 1.

EXAMPLE 3

The technique employed in this example is similar to that of Example 1 with the exception that the carbon black utilized is not aftertreated by partial oxidation thereof. Instead, there is utilized a virgin carbon black pigment of the type used as a starting material to produce the Black Pearls 1300 pigment employed in Example 1. This carbon black has a volatile content of only about 2.3% by weight thereof. Iron naphthenate was utilized as the organic acid salt color development aid. Substantially no improvements in jetness, masstone or surface appearance of the finished coating are observed over the control utilizing this unaftertreated carbon black pigment in combination with the iron naphthenate.

EXAMPLE 4

Two acrylic enamel coating compositions are produced in accordance with the following regimen:

To a one-quart stainless steel ball mill receptacle of the same type employed in Example 1 and containing a similar charge of stainless steel balls there are charged:
65 grams of the same type of carbon black employed in Example 1;
425 grams Melamine D-4225M—60%, a melamine/formaldehyde resin solution comprising 60% by weight resin solids (Cook Paint and Varnish Company, Kansas City, Missouri); and
101 grams xylene.

In the case of the control composition no other ingredients are employed. However, in the case of the coating composition produced in accordance with the invention, there is additionally charged 6.5 grams of a solution of iron naphthenate having an iron content of 6% by weight, thereby yielding a concentration of 0.6% iron by weight of the carbon black. The resulting charge is then ball milled for about 40 hours.

The control and experimental mill pastes are each reduced in a single letdown step, 150 grams of the mill paste being charged into a wide mouth jar equipped with a laboratory stirrer. To this portion of the mill paste there is slowly added, with continuous stirring, a pre-mixed letdown charge consisting of:
25 grams virgin Melamine D-4225M—60%;
315 grams Acrylic D-4234M—60% (Cook Paint and Varnish Company, Kansas City, Missouri);
95 grams xylene;
17 grams n-butanol;
3.5 grams of a 2% solution, by weight, of SF-69 silicone fluid in xylene.

After addition of this letdown charge, the acrylic coating composition is stirred for an additional 10 minutes and is then strained through a fine cone strainer. After standing overnight in a closed container, film casting, baking and evaluation of the control and experimental coating compositions are carried out in the same manner as disclosed in Example 1. Ascribing a jetness value of zero to the control, the coating composition of the invention compared thereto is found to have a jetness value of −6; the surface appearance of the coating composition of the invention is unchanged from that of the control and the masstone of the control is 0 while that of the composition of the invention is −1.

EXAMPLE 4

Control and experimental nitrocellulose lacquer mill base compositions are prepared by ball milling the following ingredients in a stainless steel ball mill for about 21 hours.

| | Weight grams | |
|---|---|---|
| Ingredient | Control | Experimental |
| Carbon black (Black Pearls 1300) | 14.5 | 14.5 |
| Aroplaz 2580 X60 (alkyd) | 121.0 | 121.0 |
| Xylene | 17.3 | 17.3 |
| Iron naphthenate (6% iron solution) | — | 2.9 |

The resulting mill base compositions are reduced to the final lacquer compositions in two steps. In the first step the mill base compositions are charged into separate jars equipped with laboratory stirrers and, with constant stirring, there is added to each a mixture consisting of: 91.0 grams of Aroplaz 2580 X60 alkyd resin and 111.5 grams of xylene. After incorporation of the first reducing mixture there is then slowly added to each of the continuously stirred compositions a nitrocellulose solution consisting of the following ingredients, in grams:

| | |
|---|---|
| Nitrocellulose (RS, ½ second) | 118.0 |
| Ethanol | 20.1 |
| n-butanol | 57.5 |
| Butyl cellosolve[(1)] | 98.0 |
| Butyl acetate | 147.0 |
| Dibutyl phthalate | 41.0 |

[(1)]ethylene glycol monobutyl ether (Union Carbide Corporation, New York, New York).

The color development properties of the resulting lacquer compositions are determined in a manner similar to that of Example 1 with the exception that, following casting of the sample coating films on a glass plate, the cast lqcquer compositions are allowed to air dry at room temperature for about ½ hour rather than being baked in the manner employed to cure the enamel compositions of Examples 1 through 3. The color development properties of the black pigmented lacquer compositions are as follows:

| | Composition | |
|---|---|---|
| Property | Control | Experimental |
| Jetness | 0 | −8 |
| Masstone | 0 | +10 |
| Surface Appearance | good | excellent |

What is claimed is:
1. A coating composition comprising:
   (A) a solvent-reduced vehicle containing between 10 to 60% by weight of a film forming resinous binder solute;
   (B) between about 0.1 and about 20% by weight of the total composition of a carbon black pigment having a volatile content of at least about 4% by weight; and
   (C) an organic acid salt of a metal chosen from the group consisting of iron, zirconium and mixtures thereof, said salt being present in an amount sufficient to provide between about 0.05 and 3%, as metal, by weight of the carbon black pigment.

2. The composition of claim 1 wherein said binder solute comprises an acylic resin.

3. The composition of claim 1 wherein said carbon black pigment has a volatile content of at least about 6% by weight.

4. The composition of claim 1 wherein said metal is iron.

5. The composition of claim 1 wherein said metal is zirconium.

6. The composition of claim 1 wherein said organic acid salt is a fatty acid salt.

7. The composition of claim 1 wherein said organic acid salt is a naphthenic acid salt.

8. The composition of claim 1 wherein said carbon black pigment is present in an amount of at least about 1% by weight of the total composition.

9. A carbon black pigment composition comprising carbon black pigment having a volatile content of at least 4%, by weight, and an organic acid salt of a metal chosen from the group consisting of iron, zirconium and mixtures thereof, said salt being present in an amount sufficient to provide between about 0.05 and 3%, as metal, by weight of the pigment.

10. The carbon black pigment composition of claim 9 wherein said salt is present in an amount sufficient to provide between about 0.5 and about 1.5% of the metal by weight of the pigment.

11. The carbon black pigment composition of claim 9 wherein said carbon black pigment has a volatile content of at least about 6% by weight.

12. The carbon black pigment composition of claim 9 wherein said metal is iron.

13. The carbon black pigment composition of claim 9 wherein said metal is zirconium.

14. The carbon black pigment composition of claim 9 wherein said salt is a fatty acid salt.

15. The carbon black pigment of claim 10 wherein said salt is a naphthenic acid salt.

* * * * *